United States Patent Office 3,127,363
Patented Mar. 31, 1964

3,127,363
PROCESS FOR THE MANUFACTURE OF ELASTOMERIC ORGANO-POLYSILOXANE PRODUCTS
Siegfried Nitzsche and Manfred Wick, both of Burghausen, Upper Bavaria, Germany, assignors to Wacker-Chemie G.m.b.H., Munich, Germany, a firm of Germany
No Drawing. Filed Aug. 3, 1956, Ser. No. 602,081
Claims priority, application Germany Aug. 5, 1955
33 Claims. (Cl. 260—18)

As is known, it has hitherto been possible satisfactorily to vulcanise silicone elastormers only with the use of organic peroxides. The vulcanisation has been carried out only at temperatures above 100° C., because only above that temperature does the peroxide used decompose to form radicals which bring about the cross-linking of the siloxane chains. However, the peroxide also forms as decomposition products gases, for example, carbon dioxide, which render vulcanisation of rather thick articles impossible without the application of pressure, because otherwise gas bubbles are formed. The vulcanisation of thick articles of silicone rubber with the use of peroxides and without bubble formation has taken an uneconomically long time. Moreover, it has not been possible to produce thin spreadable or casting compositions, for which relatively low molecular organosiloxanes are required, because so high a proportion of peroxide (5 to 20%) is required that even thin sheets could not be made without bubbles forming. Furthermore, owing to the radical character of vulcanisation with peroxides, the incorporation of organic fillers, such as carbon black, or anti-oxidants, in the mass is precluded, because these substances absorb the radicals formed by the decomposition of the peroxide and thereby inhibit vulcanisation.

It has been proposed to manufacture cold-curing silicone rubber from polymeric diorganosiloxanes which contain sulphuric acid or phosphoric acid residues as terminal groups. However, the action of moisture causes these terminal groups to spit off with the formation of acid which depolymerises the siloxane chains, so that the stability and heat resistance of the vulcanisate are very poor. Moreover, the acid liberated during the working up of the elastomer causes serious corrosion phenomena. Owing to their poor stability the vulcanisates would have to be freshly worked up and this makes them unsuitable for industrial use, more especially in view of the relatively long period which the products require for hardening.

The present invention is based on the unexpected discovery of a process that enables the aforesaid disadvantages in the manufacture of organopoly-siloxane elastomers to be overcome and affords the following advantages:

(1) Vulcanisation can be carried out not only at room temperature or below 100° C., but under certain conditions in a short time;

(2) Even with thick layers, and without the application of pressure, bubble-free vulcanisates are obtained;

(3) Spreadable or casting compositions of very low viscosity and capable of being hardened in the cold or with heat, can be vulcanised to yield bubble-free products;

(4) Organic fillers, such as cork, carbon black etc., as well as anti-oxidants, can be incorporated in the mass.

The distinguishing feature of the present invention is that an extensively pre-condensed difunctional silicone product is caused to react with the cross-linking agent only after a filler or assistant has been added. Only in this way is it possible to carry out the cross-linking under such mild conditions as to ensure that from such compositions elastomeric rubber-like products are obtained and not crumbly gels.

In accordance with the process of this invention a substantially difunctional, linear, extensively pre-condensed but not resin-like organosiloxane (A) of the general formula

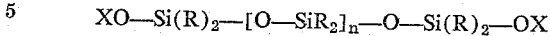

in which R represents an alkyl or aryl radical, such as a methyl, ethyl or phenyl radical, or a substituted residue such as trifluoromethyl-phenyl, $C_6H_4CF_3$; X represents hydrogen or a radical R and $n$ is a whole number of at least 50,
is vulcanised with the addition of a suitable cross-linking agent (B) and in the presence of a condensation catalyst (C) to form a silicone-rubber product of the desired shape.

The siloxanes (A) used as the main component are predominantly difunctional, but they may contain a small amount of monofunctional components. However, the content of monofunctional units must be so low that reactive hydroxyl or alkoxy groups are still present. A larger amount of monofunctional units may be present only if they are compensated by a corresponding amount of difunctional units. In all cases, the total functionality must be approximately 2, that is to say, within the range 1.9 to 2.1.

The added components serving as cross-linking agents (B) are principally polyfunctional organo-silicon compounds containing more than two functional groups. They are either organo-silicon compounds of the general formula $R_mSiX_{4-m}$, in which R is an alkyl or aryl radical, X is a reactive group capable of condensation such as a hydroxyl, alkoxy, aryloxy or amino group and $m$ is a number from 0 to below 2; or they are the corresponding siloxanes. This definition covers mainly the following groups of compounds:

(a) Silanes of the formula $R_mSiX_{4-m}$;
(b) Corresponding di-, tri-, tetra- or polysiloxanes;
(c) Organo-polysiloxane resins having a functionality greater than 2, and advantageously greater than 2.5;
(d) Organo-hydrogen-polysiloxanes of the formula

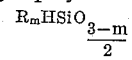

in which $m$ is a number less than 2, but is not zero.

According to the present process, the difunctional chain of a siloxane (A) is condensed, for example, with a trifunctional cross-linking agent (a) according to the following scheme:

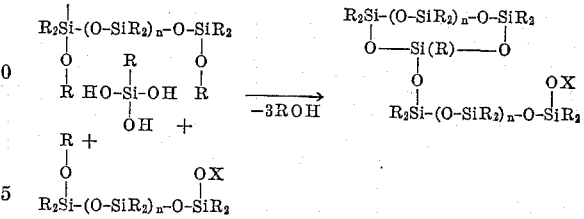

The reactive groups in the organo-silicon compounds (B) to be used as cross-linking agents are preferably alkoxy groups. Other groups react more slowly than alkoxy groups, so that when a silicon compound so substituted is used a correspondingly larger proportion of the cross-linking agent is required for rapid vulcanisation. As cross-linking agents, there are suitable among silanes (a) principally compounds of the formula $R_mSi(OR')_{4-m}$, in which R is an alkyl radical, for example, ethoxy-silane, methyl-triethoxysilane and phenyl-tributoxysilane, and also siloxanes (b), such as dimethyl-tetraethoxydisiloxane and dimethyl-diphenyl-hexaethoxy-tetrasiloxane.

Organo-polysiloxane resins suitable as cross-linking agents (c) are primarily methyl-siloxanes or resins which contain both monomethyl and dimethyl or monophenyl units, and in all cases preferably those in which the reactive groups are ethoxy groups. There may also be used, for example, ethyl-siloxane resins in which the ratio R:Si is 1.4:1 and which contain 15% of butoxy groups, or in which the ratio R:Si is 1.1:1 and which contain 10% of methoxy groups, or methyl-phenyl-siloxane resins containing 50% of monomethyl units, 25% of dimethyl units and 25% of monophenyl units.

Even better results than those obtained with the aforesaid cross-linking agents and with those previously proposed, are obtained in accordance with the present invention with organo-hydrogen-polysiloxanes (d) of the general formula

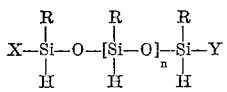

in which R is an ordinary hydrocarbon radical, such as methyl or phenyl, and X and Y are reactive groups, such as OH, OR, OSi(CH$_3$)$_3$ or the like. When the hydrogen in these siloxanes is regarded as a functional group, these organo-siloxanes are more than difunctional, which is evident from the fact that during the vulcanisation hydrogen is evolved. When all hydrogen has been eliminated, the reaction product of a methyl-hydrogen-polysiloxane is a methyl-silicone resin in which the R:Si ratio is 1:1.

The use of such methyl-hydrogen-polysiloxanes has the following further advantages over the known art:

(a) Vulcanisation proceeds more rapidly.

(b) The vulcanisates possess a better impact resistance.

(c) The vulcanisates adhere more firmly to glass, metal and the ordinary types of silicone-rubber, which enables them to be used as adhesives for silicone rubber in the cold.

(d) In vulcanising with a methyl-hydrogen-polysiloxane hydrogen is liberated, so that, by selecting suitable working conditions, foaming can be produced during vulcanisation, that is to say, foam-like, spongy or cellular silicone rubber can be made in a relatively simple manner.

(e) In contradistinction to silicone rubbers which must be vulcanised with peroxides, products containing methyl-hydrogen-polysiloxane can also be vulcanised in the presence of water, which renders them suitable for the manufacture of silicone rubber latex.

Those components used as cross-linking agents which are more than difunctional are advantageously used in a proportion from about 0.5 to about 10% calculated on the weight of the difunctional siloxane component. A larger proportion of cross-linking agent has no effect on the vulcanisation, since the difunctional main component contains only a limited number of reactive hydroxyl or alkoxy groups, and this number is smaller the higher the molecular weight of the difunctional siloxane. Thus, only a limited amount of the cross-linking agent can have any vulcanising effect at all, so that any excess of cross-linking agent would merely act as a filler rendering the product harder and impairing its elasticity, or, if the cross-linking agent is a volatile compound, the excess would evaporate. Although mixtures according to the present invention may contain more than 10% of cross-linking agent, an increase in the content of cross-linking agent is, of course, accompanied by a decrease in elasticity. A high content of cross-linking agent in the composition therefore leads to resin-like masses, capable of being moulded.

In certain circumstances the cross-linking agent (B) may be a polyalkyl silicate (e). However, organo-silicon compounds of a certain constitution are generally better in many respects as cross-linking agents for organo-polysiloxanes (a) than are polyalkyl silicates. Since the functionality of the above described cross-linking agents (B) of formula RSi(OX)$_3$ or their corresponding siloxanes is lower than the functionality of polyalkyl silicates, vulcanisation proceeds more slowly in the cold than when a polyalkyl silicate is used.

In general, it may be said that the vulcanisation takes about 5 times longer than when a polyalkyl silicate is used. This is an important advantage because it affords longer "pot times," that is to say that, the catalysed mass remains workable for a much longer time. In the case of polyethyl silicates the "pot time" is only 1 hour after the catalyser has been added, whereas in the case of compounds of formula RSi(OX)$_3$ the "pot time" can be 5 to 10 hours. This extended "pot time" does not of course, apply in the case of alkyl-hydrogenpolysiloxanes, but advantages of these compounds are that they enable vulcanisation to be carried out in an aqueous system, enable foaming to be brought about simultaneously, and enable cementing operations to be performed. Furthermore, shrinkage in vulcanising with a polyethyl silicate is about 0.5% greater than when a compound of the formula RSi(OX)$_3$ is used, and is in fact 2% as against 1.5% in the case of the latter. Moreover, the reactivity of polyalkyl silicates is so high that vulcanisation takes place slowly even in the absence of a vulcanisation accelerator, so that the keeping properties of masses containing a polyalkyl silicate are much inferior to those of masses containing compounds of the type RSi(OX)$_3$. The latter masses can be kept for at least 6 months and the former masses only for 1–2 months. Furthermore, thick articles vulcanised with a compound of the formula RSi(OX)$_3$ have less tendency to form bubbles when rapidly heated than do articles vulcanised with a polyalkyl silicate. Furthermore, masses vulcanised with a polyalkyl silicate are much more sensitive to moisture than those vulcanised with a compound of the formula RSi(OX)$_3$, because polyalkyl silicates hydrolyse much more readily. Therefore, it is necesary with polyalkyl silicates to use very thoroughly dried fillers, for otherwise hydrolytic decomposition of the polyalkyl silicate after a short period of storage would considerably retard the vulcanisation.

On the other hand, it has been unexpectedly found that not only can organo-silicon compounds proper be successfully used as cross-linking agents but that reactive products of silicic acid (f) are also very suitable. As such products there are meant silicic acids containing reactive groups, more especially hydroxy or alkoxy esters or hydrogen atoms, which are bound to silicon atoms, and are advantageously present at the surface. It could not have been expected that such silicic acids would be both chemically active in causing cross-linking and vulcanisation and also active in improving the mechanical properties and heat resistance of silicone rubber.

As cross-linking agents (f) there may be used, for example, silicic acids obtained by hydrolysing trichlorosilane. Silicic acids may be treated at the surface by gassing or impregnation with trichlorosilane or an organo-hydrogensilane or -siloxane to form SiH bonds at the surface. Finally, silicic acids may be superficially esterified with an alcohol, for example, butanol, to form alkoxylated silicic acids. The starting material for such an improvement may be a silicic acid filler which is used in a reactive form according to the present invention. The silicic acid products to be used in the present process can be prepared in known manner or by one of the usual methods. There are also suitable a few of the ordinary commercial silicic acid products of the reactive character for example, the silicic acid containing —SiOH groups, known as "Aerosil 600," the partially esterified silicic acid known as "Valron-Estersil" (du Pont de Nemours) and the silicic acid containing —SiH groups, known as "Silicon-Oxyhydride" (Linde Air Products). Other suitable cross-linking agents are the "Siloxen" of H. Kautsky, and the polydioxodisiloxane of H. Kautsky and R. Mueller.

The silicic acids to be used in the present process lead to silicone rubbers having improved mechanical properties, especially a higher tensile strength and impact resistance than those of siloxanes produced with peroxides, with alkylpolysilicates, with methyl-hydrogen-polysiloxanes or with compounds of the general formula $$RSi(OX)_3$$

For comparison it may be stated that the vulcanising agents last mentioned produce tensile strengths not exceeding 75 kg. per sq. cm. and values of impact resistance not exceeding 12 kg. per sq.cm. whereas the elastomers of the present invention have much higher values, as will be seen from the examples. The fillers leaving superficial —SiH bonds also have the advantage that they enable vulcanisation to be carried out in an aqueous medium, as is the case with methyl-hydrogen-polysiloxane.

Finally, it has been found that there are suitable as cross-linking agents (B) not only silicon compounds but also organo-titanium compounds (g) preferably titanium esters, such as butyl titanate, or polymers thereof. Elastomers prepared with these compounds have certain advantages. Inter alia, silicone rubber products cross-linked with a titanium ester adhere better to metal than those made with the use of silicon compounds as cross-linking agents.

Condensation or vulcanisation in accordance with the present invention can be carried out, for example, with the following catalysers (C) which are known for curing silicone resins:

Metal soaps, for example, tin ricinoleate or cobalt naphthenate;

Metal chelates, for example, chromium acetyl-acetonate;

Metal salts of thiols or dithiocarbamic-acids, for example, lead salts of mercaptobenzthiazole or zinc ethyl-phenyl-dithiocarbamate;

Metal oxides, for example, mercuric oxide, cadmium oxide or lead oxide (PbO);

Organo-metal compounds, for example, phenyl mercury acetate or dibutyltin-dilaurate;

Organic bases, preferably nitrogen bases, for example triethanolamine or polyethylene-imine;

Basic fillers such as asbestos;

Acid catalysts for example, boric acid and more especially organic acids, such as oleic acid.

Of special value are, inter alia, organic acids and bases. On the other hand, many metal salts of simple carboxylic acids have the disadvantage that they act too slowly, (for example, zinc 2-ethylhexoate), are not satisfactory physiologically (for example, lead octoate), or discolour the mass (for example, iron and cobalt 2-ethylhexoate).

It is advantageous to use 0.1 to 5% of the condensation accelerator calculated on the weight of the difunctional siloxane component. It will be understood that the higher the content of condensation accelerator, the more rapidly the vulcanisation takes place.

There may, of course, be added to the mixture of the difunctional compound, the cross-linking agent and the condensation accelerator, any filler or additive customarily used in the manufacture of silicone rubber to improve the mechanical properties and the resistance to permanent deformation. There may also be added antioxidants and organic fillers.

The compositions produced in accordance with the present invention are suitable, for example, as sealing, impregnating or casting compositions, as paints or coating compositions, and for the manufacture of moulded or injection-moulded articles of any kind.

They can be hardened with or without heat. In the latter case they are especially suitable for impregnating organic material such as paper, textiles and the like. Spreadable and casting compositions made in accordance with the invention are especially suited for casting round or embedding electric windings, for the manufacture of laminated products, insulating tapes and other electrical insulating materials. The compositions are also very suitable for the production of moulds for moulding ethoxyline or polyester resins.

The following examples of a few applications of the invention:

(I) USE AS DISPERSIONS

Dispersions of silicone rubber capable of vulcanisation with heat have been known for a long time and have the disadvantage that even with a low content of solids they possess a very high viscosity, and must be diluted to a content of 15% of solids to enable them to be used in immersion processes or for spraying with a spray gun or for brushing. Furthermore, it is impossible to use heat vulcanisable silicone rubber dispersions for protecting against corrosion of large surfaces such, for example, as chimney flues or furnace plants, because such extensive areas cannot be satisfactorily vulcanised. Even when it is possible, for example, to heat a coating of heat vulcanisable silicone rubber applied to a chimney wall before starting up the chimney, satisfactory vulcanisation cannot be achieved because the necessary vulcanisation temperature is only slowly reached, and during this time the bulk of the vulcanising agent undergoes slow decomposition without any useful result. Furthermore, in the case of exterior coatings the vulcanisation of heat vulcanisable silicone rubber is immediately interrupted, for example, by rain falling on the vulcanised mass, because the peroxide used as vulcanising agent reacts preferentially with water and not with the siloxane.

It is indeed possible to produce heat vulcanisable silicone rubber dispersions that do not have the disadvantage of a high viscosity combined with a low content of solids. This can be accomplished, for example, by making the heat vulcanisable silicone rubber with a polysiloxane of low molecular weight. However, in this case, in order to achieve a non-tacky vulcanisation, it is necessary to use more than 4% of peroxide as vulcanising agent, and this markedly impairs the heat resistance of the silicone rubber, because it leads to a high degree of cross-linking and the decomposition products of the excess of peroxide used have an adverse affect on the ageing properties of the siloxane.

Dispersions prepared with the cold vulcanisable silicone rubber compositions of the present invention do not possess the aforesaid disadvantages, since they can be adjusted for low viscosity and a high content of solids without impairing their heat resistance, and can be vulcanised without application of heat, even in the presence of water, such as rain water. The disadvantage of ordinary dispersions prepared with cold vulcanisable silicone rubber is merely that their "pot time" is very limited after the necessary curing catalyst has been added thereto, that is to say, that the catalysed dispersions gel comparatively quickly.

By this invention the "pot time" of catalysed silicone rubber dispersions is considerably increased or, provided the content of solids is not too high, gelling does not occur at all, when an organic diluent containing oxygen, more especially a simple alcohol, ether, ester or ketone, is added to the dispersion. In order to prolong the "pot time" it is necessary that the dispersing medium used for producing the dispersion should contain at least 10% of the aforesaid diluent. The greater the proportion of diluent added, the greater is the improvement in the "pot time" of the catalysed dispersion. However, it is generally not possible to add more than 30 to 40% of the diluent, because the solvent power of these diluents for polymeric siloxane is not good.

The dispersions described above are very suitable paints and coating compositions.

(II) USE AS MODIFIED COMPOSITIONS

The range of application of vulcanisable silicone rubber masses in the manufacture of moulded products, coatings and the like is, as is known, restricted due to the high cost of silicone rubber. Moreover, it has been found that such masses cannot be extended, for example, with the usual high-boiling solvents or plasticisers for plastics, because they quickly exude from the mass even if they are thoroughly pasted with a filler before being incorporated in the mass.

On the other hand, the cold vulcanising silicone rubber masses of this invention are not only compatible with certain plastics, in particular vinyl polymers, but plasticisers present in the organic polymers do not exude from the mixture. Polyvinyl chloride is an especially suitable extender, more especially in the form of a paste.

While such additives, naturally, impair the mechanical properties of silicone rubber masses, the new mixtures possess special unexpected advantages. Thus, for example, the adhesion of cold vulcanisable silicone rubber to the surfaces of metal and plastics is improved.

Furthermore, the modified compositions of this invention can be used for purposes for which heat vulcanisable silicone rubber masses are unsuitable. Thus, heat vulcanisable silicone rubber masses cannot be sprayed on to cables covered with polyvinyl chloride or polyethylene, because owing to their thermoplasticity the last mentioned plastics would deform the cable during vulcanisation. The new cold vulcanisable silicone rubber masses, on the other hand, can be sprayed without difficulty on to such cables to improve the resistance to weather, ozone and corona of the cable covered with plastic. Thus, the modified compositions are not simply products made with cold vulcanisable silicone rubber that have been rendered less expensive by an extender, but owing to their novel properties they are especially suitable for a variety of applications. This is true not only of coatings, but also applies to the use of the compositions in the manufacture of pressure moulded articles of all kinds.

(III) USE AS MOULDING COMPOSITIONS

In view of the fact that pressure moulding compositions of gypsum, alginate or other moulding compounds hitherto used have certain disadvantages, attempts have been made for a long time to produce better products. Thus, it has been proposed to make moulding compositions from natural rubber, gutta percha, synthetic rubber and other organic plastics, which are elastically cohesive, but have no adhesive properties, if desired, in admixture with each other or with the addition of plasticisers and the usual fillers and other suitable additives. As suitable elastic plastics it has been proposed to use polyacrylic acid esters and other polyvinyl compounds as well as silicones and silicone rubber. Although a few of these plastics possessed advantages, they have been unsuitable for general use in some cases on account of their lack of dimensional precision, their odour or their physiological action, and in other cases owing to their content of plasticiser which migrates or exudes so that they do not yield durable moulding compositions. Heat vulcanisable silicone rubber masses have hardly been suitable, for example, in dentistry for moulding compositions to be used in the mouth, because, after being moulded they had to be vulcanised at an elevated temperature.

The cold hardenable silicone elastomers of the invention are excellent materials for the manufacture of durable moldings having dimensional precision. Their value arises from the unexpected observation that they harden to form products similar to soft rubber not only at room temperature, but that they do so in a suitably short time, namely in a few minutes.

The new paste-like moulding composition can be kneaded, spread or cast, and has no odour and is physiologically inactive. The compositions can be used successfully for making mouldings rapidly from articles of industrial use, articles of pure and applied art, for medicinal and scientific purposes, for example, as body fitting coverings of leg and arm prostheses, for making casts of living or dead bodies of human beings or animals, for bandaging and dental purposes and the like. The mouldings so produced are of excellent dimensional precision and retain their shape, temperature resistance and elasticity even during prolonged storage, and, if desired, the mould can be cut on one side and repeatedly cast without undergoing any appreciable shrinkage. For these purposes also the difunctional siloxane (A), which may contain fillers or other additives, should be mixed with the cross-linking agent (B) and the hardening catalyst (C) shortly before use.

The new compositions of elastic, rubber-like character are easy to handle in the aforesaid applications. The composition solidifies rapidly, resists heat and cold and retains its shape, and is insensitive to all kinds of moisture. It is particularly well suited for making casts of bodies, more especially parts of the human body, and above all for dental purposes as a moulding composition for making casts of the mouth and the teeth, because it reproduces accurately differences in cross-sectional shape. It is likewise valuable as a supporting lining for prostheses of all kinds, which are thus rendered more comfortable in use. For plaster of Paris and gauze bandages the material of this invention can also be used as a support and when resting directly on the bandaged part of the body its elasticity probably has a favourable effect on the healing process. The material is also very suitable for making casts of ears for hearing aids, and also for making casts of other parts of the body for bandaging purposes, for example, for securing arm or leg fractures, and it is quite generally suitable as a moulding composition for industrial purposes, for example, for jewelry and as casting composition for insulating purposes.

(IV) USE AS A FILLING FOR THE ROOTS OF TEETH

The new cold vulcanisable silicone rubber compositions are especially suitable as root fillings for decayed teeth, for which purpose there may be incorporated with the compositions the usual dental medicaments, such as anodynes, disinfectants or devitalising medicaments, because within a few minutes after having been pressed into the root channel they set to form a solid though still elastic mass, which has the advantage that it is easy to remove should any complications arise after the treatment. The new dental root fillings also have the advantage that it is not necessary subsequently to insert a root plug made of gutta-percha, precious metal or the like.

(V) USE AS A SEALING COMPOSITION

For sealing joints, for example, slabs, pipes and other structures of concrete or ceramic materials, it is known to use not only bitumen, pitch or asphaltum, but also a wide variety of plastics. However, it has been found that these substances are not resistant to the attack of bacteria or fungi such as occur in the soil, for example, *Aspergillus niger* or *Penicillium glaucum*. In fact, bitumen and plastics, such as polyethylene, constitute favourable nutrient media for such bacteria or fungi, so that these sealing materials are destroyed by the action of these organisms in a few years. It has also been found that in the course of time bitumen and plastics undergo progressive embrittlement due to oxidation so that a leak occurs in a seal when a pipe bends at a joint owing to soil subsidence. Numerous rubber-elastic products, such as natural or synthetic rubber, not only deteriorate by ageing, but also have the disadvantage that their resistance to cold is poor, which is particularly evident when the pipes are laid in a concrete road surface or in the upper layers of the ground.

The cold vulcanisable silicone rubber compositions of the present invention are excellent agents for sealing and packing joints between structural components since they do not exhibit the aforesaid disadvantages. They are entirely resistant to ageing and cold and bacteria, and they also possess sufficient elasticity to yield to the expansion at joints caused by movements of the structural components on or in the ground. Apart from the excellent properties mentioned above, the masses have the further advantage that they adhere well to ceramics, concrete and the like. Accordingly, if necessary after the incorporation therein of suitable fillers and/or other usual additions, the compositions of the invention can be used for filling sealed or packed joints between slabs, pipes and other structural elements made of stone, concrete or other mortar or ceramic masses, for example, joints in structural components, road surfaces, landing strips and the like made of concrete or similar materials, and more especially pipes of concrete, clay, synthetic stone, porcelain or the like.

(VI) USE AS COATING COMPOSITION FOR METALS

In the construction of motor vehicles and aircraft and in mechanical engineering it is known to line large pieces of sheet metal with plastics for sound-proofing purposes, because this is the only way in which the unpleasant noise associated with the operation of modern means of transport and machines can be reduced. It is known that efficient sound-proofing means for sheet metal for example, body sections, can be made from a wide variety of synthetic resins or mixtures of synthetic resin with fillers. However, in many cases it is impossible to use such sound-proofing means, because the modulus of elasticity of the synthetic resin binding agent used varies with temperature. For example, they cannot generally be used at low temperatures and when used at high temperatures, such masses often are too thermoplastic to retain their sound-proofing property. Moreover, at high temperature increases the masses age and embrittle rapidly, whereby the efficiency of the binding agent is substantially impaired. The binding agent often comes into contact with hot engine oil which dissolves or destroys it.

Silicone rubber would be the ideal binding agent for sound-proofing preparations. However, the hitherto known heat vulcanisable silicon rubbers are not suitable because it is impracticable or too difficult to carry out the vulcanisation with heat on large sheet metal components. Furthermore, it is impossible to vulcanise heat vulcanisable silicon rubbers in the presence of fillers that are efficient absorbers of sound, such as cork meal, because these fillers react preferentially with the peroxide used as vulcanising agent, and the latter does not react with the silicone.

On the other hand, the cold vulcanisable silicone rubber compositions of the present invention form coatings that adhere very well to metal surfaces, especially metal sheets and are especially useful as binding agents for sound deadening and sound-proofing materials, because, in the first place, cork meal asbestos wool and similar sound-deadening fillers can be mixed with them and, secondly, because they can be vulcanised without the use of any special auxiliary means.

The adhesion of the compositions to metals cannot be improved by the adhesives such as tetraethyl silicate or polyethyl silicate, conventionally used with heat vulcanisable compositions, but good adhesion is ensured by first lacquering the metal surface with a solution of a silicone resin. In contradistinction to the known practice, however, it is not necessary to bake the silicone resin primer, as is usual because the hardener or cross-linking agent (B) used in the present process is able to cure the silicone resin even at ordinary temperature. Thus, for example, dibutyl-tin dilaurate alone or in conjunction with a tetraalkyl silicate or polysilicate or in conjunction with an alkyl-hydrogen-polysiloxane, is sufficient to cure the silicone resin under-layer and it is not necessary to add any of the aforesaid hardeners to the solution of the silicone resin. The quantities of hardener or cross-linking agent present in the cold vulcanisable silicone rubber composition, which diffuses therefrom into the resin coating, suffice to harden the silicone resin under-layer adequately and to bind it to the metal surface. This discovery is of great importance in connection with coatings of silicone resin and is of general application, irrespective of whether the resin grounding is subsequently covered with silicone rubber or not.

(VII) USE IN THE MANUFACTURE OF LAMINATES

The invention also includes the manufacture of laminated materials from one or more supports bonded together with cold vulcanisable silicone rubber.

The manufacture of laminated materials from, for example, various fabrics and/or metal foils bonded by means of silicone rubber for use as sealing or packing material or conduits, for example, in the form of bases, and the manufacture of laminated insulating materials for electrical purposes with a silicone rubber binder to produce coil formers and for insulating Roebel rods for electrical machines, have recently been considerably extended. Such laminates have good mechanical properties, swell little in solvents, are very resistant to permanent deformation and have excellent electrical properties. Unfortunately, however, the manufacture of such laminates or laminated insulating materials has been difficult, owing to the necessity of vulcanising the silicon rubber at an elevated temperature. To prevent bubble-formation vulcanisation had to be carried out with the application of pressure in a mould or under steam pressure in an autoclave, and in the case of insulating material for electrical purposes the vulcanisation had to be performed in clamping machines. As such laminates, for example, flexible pipes or insulations for the windings of large motors, are sometimes of considerable size, this method is extremely difficult and expensive, and in some cases quite impossible, to perform.

The cold vulcanisable silicone rubber compositions of the present invention enable the aforesaid difficulties to be obviated. However, the presence of the catalyst (C) for hardening requires the compositions to be worked up very quickly, because, owing to their very short "pot time," they harden very rapidly at room temperature. It is, therefore, necessary freshly to prepare a small batch of silicone rubber mixed with hardener and to use the batch as rapidly as possible. Even so, a certain amount of the batch will always be wasted, because it cannot be used up quickly enough. This difficulty can be overcome by not applying the silicone rubber composition as such to the support, but applying to the support used to produce the laminate, for example, the metal foil, glass silk or other textile material, either the cross-linking agent (B) or the catalyst (C), and subsequently applying the siloxane mass in non-hardened form to the support in admixture only with the other additive (B) or (C). If desired, a further layer of the support, which has been impregnated with the catalyst, is applied and so on. In order to produce relatively thin laminates, the support can be used without first having been treated and the laminate then impregnated with the additive that has not been incorporated in the siloxane mass. In this manner diffusion of the two additives within the superposed laminations causes cold vulcanisation to take place in the finished winding. The siloxane mass so used has, of course, a practically unlimited pot time, because it contains only one of the two additives required for hardening.

Finally two different siloxane masses may be prepared, one of which contains the catalyst for hardening and the other the cross-linking agent. In this case the support, for example, glass silk, is impregnated with one of the masses and the other mass is applied to the material so impregnated.

The following examples illustrate the invention.

*Example 1*

100 grams of a dimethyl-polysiloxane having a molecular weight of 500,000 were mixed on a roller mill with 70 grams of calcined diatomaceous earth, 10 parts of a methyl-silicone resin containing 5% of ethoxy group and 1.5 parts of dibutyl-tin dilaurate, and the resulting sheet was alternately vulcanised at room temperature and at 50° C., 100° C., 150° C. and 200° C. In the following table are given the properties of the vulcanisates so obtained:

| Vulcanisation time in hours | 4 | 8 | 24 | 1 | 1 | 0.5 | 0.1 |
|---|---|---|---|---|---|---|---|
| Vulcanisation temperature, ° C | 20 | 20 | 20 | 50 | 100 | 150 | 200 |
| Tensile strength, kg./cm.² | 25 | 28 | 35 | 30 | 32 | 35 | 45 |
| Elongation at break, percent | 390 | 370 | 350 | 350 | 360 | 350 | 330 |
| Shore hardness (scale A) | 45 | 50 | 55 | 50 | 55 | 60 | 60 |

*Example 2*

100 grams of a dimethyl-polysiloxane having a viscosity of 300 centistokes were mixed with 50 grams of silicious chalk, 10 grams of phenyl-tributoxysilane and 5 grams of lead oxide. A spool was covered with the liquid mass in a sheet metal mould. After standing for 3 days at room temperature the mass had become an elastic, bubble-free body. After being aged for 2 days at 200° C. the loss in weight of the mass was only 1.2%.

*Example 3*

100 grams of a polysiloxane consisting of 93 molecular proportions percent of dimethylsiloxane units and 7 molecular proportions percent of methyl-phenyl-siloxane units, and having a viscosity of 5000 centistokes, were mixed with 200 grams of electrode carbon, 10 grams of tetraethoxysilane (containing 40% $SiO_2$) and 5 grams of lead octoate, and the mass was cured for 20 minutes at 150° C. A silicone rubber having a conductivity of 100 ohms/cm. was obtained.

Instead of tetraethoxysilane a methylsiloxane resin (ratio R:Si=1.1:1) containing 10% of methoxy groups may be used.

*Example 4*

Mixtures were prepared as described in Example 1, except that, instead of 1.5 parts of dibutyl-tin dilaurate, there were used for each mixture 3 parts of one of the condensation catalysts mentioned in the following table. The mass was vulcanised for 1 day at room temperature, and the mechanical properties of the resulting products were then measured:

| Catalyst | Tensile Strength, kg./sq.cm. | Elongation at break, percent |
|---|---|---|
| Iron-acetyl-acetonate | 10 | 200 |
| Zinc ethyl-phenyl dithiocarbamate | 15 | 250 |
| Phenyl mercury acetate | 25 | 320 |
| Triethanolamine | 42 | 410 |
| Boric acid | 7 | 110 |

*Example 5*

Mixtures were prepared as described in Example 1, except that the methyl-silicone resin used was mixed for each mixture with 10% of one of the following cross-linking agents, and vulcanised for 1 day at room temperature. Measurements gave the following data:

| Cross-linking Agent | Tensile Strength, kg./sq. cm. | Elongation at break, percent |
|---|---|---|
| Methyl-triethoxysilane | 31 | 310 |
| Silicone resin from 50 mol percent each of monophenyl- and monomethyl-units with 15 mol percent of hydroxyl groups | 25 | 290 |
| Siloxane from 50 mol percent each of monomethyl- and dimethyl-unit with 10 percent ethoxy groups | 35 | 340 |

*Example 6*

100 grams of a dimethyl-polysiloxane (viscosity: 1000 centistokes), 200 grams of zirconium silicate, 1 gram of aldol-α-naphthylamine as antioxidant, 10 grams of the methyl-silicone resin described in Example 1 and 1.5 grams of dibutyl-tin dimaleate were mixed together. After standing for 24 hours at room temperature the mass yielded an elastic mass of oustanding heat resistance.

*Example 7*

100 grams of a dimethyl-polysiloxane (molecular weight=500,000) were mixed on a roller mill with 100 grams of calcined diatomaceous earth and 2 grams of methyl - hydrogen - polysiloxane (viscosity: 150 centistokes). From this mixture a round bobbin of 5 mm. diameter was made in an injection moulding machine and the bobbin was then immersed in a bath containing dibutyl-tin dilaurate as cross-linking catalyst. After 10 minutes at room temperature a bobbin of vulcanised silicone rubber was obtained which had a tensile strength of 50 kg. per sq. cm. and an elongation at break of 350%.

*Example 8*

100 grams of dimethyl-polysiloxane (viscosity: 20,000 centistokes) were mixed on a roller mill with 50 grams of siliceous chalk, 5 grams of methyl-hydrogen polysiloxane (viscosity: 100 centistokes) and 5 grams of zinc octoate. The resulting mass was spread on glass fabric and the fabric so coated was allowed to stand for 1 hour at room temperature, whereby a rubber-like elastic coating formed on the glass fabric. The glass fabric is very suitable as an insulating tape for electrical purposes.

*Example 9*

100 grams of a dimethyl-polysiloxane (viscosity: 1000 centistokes) were mixed with 100 grams of Champagne chalk, 5 grams of methyl-hydrogen-polysiloxane and 5 grams of dibutyl-tin dilaurate, and the mixture was poured into a metal mould which had previously been brushed with soap solution to facilitate the removal of the moulded product. After standing at room temperature for 2 hours, the product was removed in the form of a block of silicone foamed rubber.

*Example 10*

The mixture described in Example 3 was emulsified with water with the addition of 2% of triethanolamine oleate to form a silicone rubber latex having a content of 60% of solids. 3 grams of methyl-hydrogen-polysiloxane and 1 gram of dibutyl-tin dimaleate were then added to each 100 grams of the aforesaid mixture. The resulting latex was used to impregnate a cotton fabric, and the mass was vulcanised by heating it for 5 minutes at 100° C.

*Example 11*

On a roller mill 5 grams of methyl-hydrogen-polysiloxane were mixed with 50 grams of the mixture described in Example 2 (mixture X), and 5 grams of triethanolamine were separately mixed with 50 grams of the mixture according to Example 2 (mixture Y). Mixture X was spread on a sheet of silicone rubber and mixture Y on another sheet of silicone rubber. The sheets so treated were then pressed together and care was taken, by slightly moving them while in contact, that mixture X and mixture Y intermixed. After standing for 1 hour at room temperature a strong bond had been formed between the two sheets of silicone rubber. The same procedure may be used for sticking a silicone rubber sheet to glass or metal.

*Example 12*

100 grams of a polymeric dimethyl-polysiloxane (viscosity: 1,000,000 centistokes) were mixed with 50 parts of a silicic acid product, of which the —SiOH groups at the surface had been esterified with butanol, and 1 gram each of triethanolamine and lead oxide were added to the mass. After standing at room temperature for 24 hours, a vulcanisate having a tensile strength of 88 kg. per sq. cm., an elongation of 600% and an impact resistance of 20 kg. per cm. was obtained.

*Example 13*

100 grams of a polymeric siloxane (containing 95 mol percent of dimethyl-siloxane units, and 5 mol percent diphenyl-siloxane units) were ground with 2 grams of zinc octoate and 40 grams of an extremely finely ground silicic acid product obtained by burning silicon tetrachloride in a current of hydrogen at as low a temperature as possible and having a large number of —SiOH groups at the surface. After being allowed to stand for 5 hours at room temperature, the mass was found to be completely vulcanised.

*Example 14*

100 grams of a dimethyl-polysiloxane were mixed with 50 grams of a silicic acid product obtained as follows: A slow current of nitrogen was blown through a vessel containing trichlorosilane, and the nitrogen charged with trichlorosilane in this manner was passed over a frit placed in a vessel filled with ice-cooled water, whereby the trichlorosilane was hydrolysed, and the product was then used as described above. 0.5% of dibutyl-tin dilaurate were subsequently added to the mass whereupon the mass vulcanised within 5 hours at room temperature. The resulting silicone rubber had a tensile strength of 102 kg. per sq. cm., an elongation at break of 620% and an impact resistance of 25 kg. per cm.

*Example 15*

A mixture was prepared as described in Example 3, except that, instead of a product obtained by hydrolysing trichlorosilane, there was used a silicic acid product which had been treated by gassing it with trichlorosilane and had a surface of 150 grams per sq. metre and an average particle size of 20 m$\mu$. The silicone rubber so obtained vulcanised in 15 minutes at 150° C., and had a tensile strength of 99 kg. per sq. cm., an elongation at break of 670% and an impact resistance of 18 kg. per cm. Similar results were obtained when the aforesaid filler was gassed with monomethyldichlorosilane, $CH_3SiH(Cl)_2$, instead of with trichlorosilane.

*Example 16*

100 grams of a dimethyl-polysiloxane (viscosity: 2 million centistokes) were mixed with calcined diatomaceous earth and 5 grams of a polymeric butyl titanate boiling at 250° C. under a pressure of 8 mm. of mercury. 2 grams of dibutylamine were then added, and in 3 hours the mass solidified at room temperature to yield a substance having a rubber-like elasticity. Instead of dibutylamine, there may be used as condensation catalyst, for example, dibutyl-tin dilaurate, zinc octoate or lead oxide.

The vulcanisates obtained as described in Examples 1 to 16 can be given any desired shape before or during vulcanisation.

*Example 17*

A cold vulcanisable silicone rubber composition was prepared by mixing 100 grams of dimethyl-polysiloxane (viscosity: 15,000 centistokes) with 50 grams of quartz meal, 10 grams of silicon carbide dust and 20 grams of kieselguhr on a three-roller mill. This mixture was pasted with xylene to yield a dispersion of 80 percent strength, and then separate portions of 1 part each of the dispersion were diluted with different diluents to give a content of 50% of solids. Each diluted dispersion was mixed with 1 gram of dibutyl-tin dilaurate and 2 grams of hexaethoxy-disiloxane per 100 cc., as curing agent, and the change in viscosity of each dispersion was measured at certain intervals. The results are shown in the following table:

| Dispersion | Diluent | Viscosity in seconds (German Industrial Standards beaker with 4 mm. nozzle) after— | | |
|---|---|---|---|---|
| | | 0 hours | 10 hours | 50 hours |
| A | Toluene | 65 | 600 | gelatinised. |
| B | butanol | 70 | 75 | 85. |
| C | ethyl acetate | 65 | 70 | 90. |
| D | methyl-ethyl ketone | 60 | 65 | 75. |
| E | dibuyl ether | 65 | 75 | 75. |
| F | trichlorethylene | 60 | gelatinised | gelatinised. |
| G | carbon tetrachloride | 60 | do | Do. |
| H | methylene chloride | 60 | do | Do. |

This table shows that only the addition of a diluent containing oxygen inhibits gelation. When a dispersion so obtained is applied to a surface of any kind, an excellent coating is obtained.

*Example 18*

100 grams of a dimethyl-polysiloxane (viscosity 30,000 centistokes) were mixed on a roller mill with 50 grams of calcined diatomaceous earth. The silicone mixture so obtained was then mixed with an equal quantity of a polyvinyl chloride paste of the following composition: 70 grams of powdered polyvinyl chloride, 25 grams of diamyl phthalate and 5 grams of dibutyl-tin dilaurate. To 10 grams of this mixture there were then added 2 grams of methyl-hydrogen-polysiloxane (viscosity: 150 centistokes), whereupon vulcanisation takes place in 6 minutes. Vulcanisation causes neither shrinkage nor exudation of the plasticiser. In this case the use of dibutyl-tin dilaurate had the great advantage that it acts both as a condensation accelerator for the cross-linking of the silicone mass and as an excellent stabiliser for the polyvinyl chloride.

*Example 19*

100 grams of a dimethyl-polysiloxane (viscosity 30,000 centistokes) were mixed on a three-roller mill with 70 grams of kieselguhr and 30 grams of powdered mica. To 10 grams of the mixture there were then added 3 grams of a polyethyl silicate containing 50% of ethoxy groups, and also 0.5 gram of dibutyl-tin dilaurate, whereupon the consistency of the mass slowly increases. After about 6 minutes the somewhat thickened mass can be used, for example, in dentistry by placing it on a spoon and inserting it in the mouth. The patient then bites into the pasty mass and keeps it in his mouth for about 10 minutes. The fully vulcanised impression is then removed from the mouth.

*Example 20*

100 grams of the mass described in Example 19 were mixed with 1 gram of a methyl-hydrogen-polysiloxane (viscosity: 100 centistokes) and 1 gram of dibutylamine, and vulcanisation took place in 3 minutes at room temperature under the conditions described in Example 19.

*Example 21*

100 grams of a dimethyl-polysiloxane (viscosity: 200,000 centistokes) were mixed on a roller mill with 200 grams of zirconium silicate. To 10 grams of this mass there were then added 2 grams of a methyl-silicone resin (in which the R:Si ration was 1.2:1 and which contained 15% of free hydroxyl groups) and 1 gram of dibutyl-tin dilaurate, whereupon vulcanisation took place in 15 minutes under the conditions described in Example 19. Vulcanisation is not accompanied by any shrinkage.

*Example 22*

A polymer having a viscosity of 30,000 centistokes was obtained by polymerising a dimethyl-silicone oil with the aid of a phosphorus-nitrogen compound as described in German patent specification No. 930,481. To every 100 grams of polymer there were added 50 grams of kieselguhr and 4 grams of methyl-hydrogen-polysiloxane to form a moulding composition which was vulcanised on adding 2% of dibutyl-tin dilaurate in a period of 2 minutes at room temperature. The vulcanisate is non-tacky.

*Example 23*

By polymerising an octamethyl-cyclotetrasiloxane with 0.05% of potassium hydroxide at 150° C. a polymer was obtained having a viscosity of 30,000 centistokes. The polymer was dissolved in toluene, ethanol was then slowly added while stirring well, until about 10% of the polymer had precipitated as an insoluble substance. Precipitation with ethanol is then continued until about 70% of the polymer used had settled out. This fraction (viscosity: 18,000 centistokes) was mixed as described in Example 22 with 50 grams of kieselguhr and 4 grams of methyl-hydrogen-polysiloxane for every 100 grams of polymer, and the product was vulcanised by adding 2% of dibutyl-tin dilaurate. After 3 minutes at room temperature a non-tacky vulcanisate was obtained.

*Example 24*

10 kg. of siliceous chalk and 20 grams of methyl-hydrogen-polysiloxane (viscosity: 100 centistokes) were mixed with 10 kg. of a dimethyl-polysiloxane having terminal hydroxyl groups and a viscosity of 100,000 centistokes. 2 kg. of dibutyl-tin dilaurate per 10 kg. of this mass were added, and the resulting compound was used for sealing the joints between concrete pipes.

*Example 25*

A mixture of 10 kg. of silicone oil (viscosity: 30,000 centistokes), 5 kg. of Champagne chalk and 1 kg. of a methyl-silicone resin, in which the R:Si ratio was 1:1 and which contained 15% of ethoxy groups was prepared. 400 grams of dibutyl-tin dilaurate were added, and the material so obtained was used as a sealing compound as described in Example 24.

*Example 26*

A carefully cleaned and degreased sheet of metal was lacquered with a solution of silicone resin obtained as described in German patent specification No. 873,433. Upon the resulting under-layer was spread a cold vulcanizable silicone rubber composition having, for example, the following composition:

10 kg. of dimethyl-polysiloxane (viscosity: 20,000 centistokes),
5 kg. each of asbestos meal and kieselguhr,
200 grams of methyl-hydrogen-polysiloxane (viscosity 150 centistokes), and
50 grams dibutyl-tin dilaurate.

This composition vulcanized in the cold, after the addition of the dibutyl-tin dilaurate, in about 3 hours, although maximum adhesion on metal is achieved only after standing for 24 hours at room temperature, when the adhesion to metal even surpasses the tensile strength of the silicone rubber itself.

When, on the other hand, the metal sheet is treated with an adhesive of the kind used hitherto, such as tetraethyl silicate or polyethyl silicate, there is no adhesion.

*Example 27*

A metal sheet was lacquered with a solution of a methyl-ethoxy-polysiloxane resin obtained as described in German patent application W 12 744 LVc/39c, a complex compound of boric acid and methanol being used as condensing agent, and a spreadable silicone rubber preparation having the following composition was then applied:

100 grams of dimethyl-polysiloxane (viscosity 10,000 centistokes),
50 grams of kieselguhr,
30 grams of cork meal,
50 grams of methyl-hydrogen-polysiloxane (viscosity 250 centistokes),
0.2 gram of dibutyl-tin dilaurate, and
0.2 gram of triethanolamine.

After adding the two last-named ingredients, and applying the composition, it vulcanized in 1½ hours at room temperature, and if a larger proportion of the methyl-hydrogen-polysiloxane is added the mass also foams slightly, whereby its sound-proofing action is enhanced. After standing for 24 hours at room temperature, the adhesion of the rubber coating to the metal surface increases to an extent such that it exceeds the tensile strength of the rubber coating itself.

*Example 28*

100 grams of a dimethyl-silicone oil (viscosity 50,000 centistokes) were mixed with 50 grams of calcium carbonate and 20 grams of kieselguhr. 3 grams of polyethyl silicate containing 55% of ethoxy groups were then added, and the composition was made into a laminated flexible pipe in the following manner:

A polished metal mandrel, which had been wiped with some engine oil to facilitate the removal of the moulded product, was coated with the silicone composition. A tape of glass silk, which had been impregnated with a solution of 20% strength of dibutyl-tin laurate in acetone, was wound over the coating. Then the whole was again coated with the aforesaid composition, and again wound with glass silk tape impregnated with dibutyl-tin laurate. These operations were repeated until a wall of the deesired thickness had been produced. When the laminated pipe made in this manner was allowed to stand for about 30 minutes at room temperature, it hardened to form an elastic mass of glass silk bonded with silicone rubber and could be pulled off the mandrel.

In order to make thinner laminates the impregnation of the tape of glass silk may be dispensed with, and when the laminating operation is completed, the catalyst is brushed on the surface of the finished product.

*Example 29*

100 grams of a dimethyl-silicone oil (viscosity 10,000 centistokes) were mixed with 100 grams of quartz meal and 3 grams of triethanolamine. The mixture was coated on an electric conductor, for example, a flat copper wire, measuring 10 x 3 mm. and a tape of glass silk impregnated with a toluene solution of 5% strength of methyl-hydrogen-polysiloxane having a viscosity 20 centistokes was wound in one layer round the coated conductor. Another coating of the same silicone rubber composition was applied, and these operations were repeated until an insulation having the desired thickness had been produced.

The same process can, of course, be carried out in an analogous manner with carrier materials other than glass silk, for example, natural silk, cotton, paper, mica paper or mica. If it is desired to impart to the insulating mass metallic conductivity, a metal foil may be adhesively united to the winding.

We claim:

1. A process for the preparation of a room temperature curing organo-polysiloxane elastomer, which consists in forming a mixture including a non-reactive filler whose sole reactive components are the compounds (A), (B) and (C), wherein (A) comprises the major component and is a linear, difunctional polysiloxane of the formula $$XO-Si(R)_2-[O-Si(R)_2]_n-O-Si(R)_2-OX$$

wherein R is a member of the group consisting of lower alkyl, aryl and halomethyl aryl groups, and X is a member of the group consisting of hydrogen and R, and $n$ is at least 50, (B) is a cross-linking agent which is a polyfunctional compound of the group consisting of (a) silanes of the formula $R_mSiX_{4-m}$ wherein R is a monovalent hydrocarbon radical of the group consisting of alkyl and aryl radicals, X is a member of the group consisting of —OH, alkoxy, aryloxy and amino radicals and $m$ has a value of from zero to below 2, (b) a polysiloxane obtained by polymerizing silane (a), (c) an organo-polysiloxane resin having a functionality greater than 2 of the group consisting of methyl-siloxanes, ethylsiloxanes, dimethyl-siloxanes, monophenyl siloxanes and polysiloxanes containing a mixture of said groups, (d) organo-hydrogen polysiloxanes of the unit formula

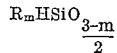

wherein $m$ is less than 2 but greater than zero, (e) reactive silicic acids, alkoxylated silicic acids and silicic acids having surface oriented —SiH groups, and (f) titanium esters and titanium ester polymers, and (C) is a condensation catalyst, shaping the mixture, and allowing the shaped mixture to cure.

2. Process in accordance with claim 1 wherein the condensation catalyst (C) is a member of the group consisting of metal soaps, metal chelates, metal salts of a thiol, metal salts of a dithiocarbamic acid, metal oxides, organo-metal compounds, amines, imines, organic acids, organic bases, and asbestos.

3. Process in accordance with claim 1 wherein said (d) organo-hydrogen polysiloxane has the general formula

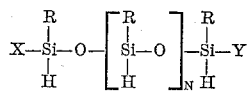

wherein R is a monovalent hydrocarbon radical and X and Y are members of the group consisting of —OH, —OR and —OSi(R)₃.

4. Process in accordance with claim 1 wherein the condensation catalyst (C) is employed in an amount of from 0.1% to 5% on the weight of the difunctional polysiloxane (A).

5. Process in accordance with claim 1 wherein the proportion of cross-linking agent (B) employed is from 0.5% to 10% by weight of the difunctional polysiloxane (A).

6. Process in accordance with claim 1 wherein the reaction takes place at a cross-linking reaction temperature below 100° C.

7. Process in accordance with claim 1 wherein said non-reactive filler is a colored pigment.

8. Process in accordance with claim 1 wherein said non-reactive filler is an antioxidant.

9. Process for the production of a room temperature curing organo-polysiloxane elastomer, which consists in forming a mixture containing a non-reactive filler and having as its sole reactive components a linear, difunctional dimethyl-polysiloxane containing a major proportion of dimethylsiloxane units and a minor proportion of methylphenylsiloxane units, a tetraethoxysilane and a lead salt of an aliphatic carboxylic acid, said linear, difunctional dimethyl-polysiloxane being the major component, shaping the mixture and allowing the shaped mixture to cure.

10. Process for the production of a room temperature curing organo-polysiloxane elastomer, which consists in forming a mixture containing a nonreactive filler and having as its sole reactive components a linear, difunctional dimethyl-polysiloxane, a methyl-hydrogen-polysiloxane and a metal salt of an aliphatic carboxylic acid, said linear, difunctional dimethylpolysiloxane being the major component, shaping the mixture and allowing the shaped mixture to cure.

11. Process in accordance with claim 10 wherein the metal salt employed is dibutyl-tin dilaurate.

12. Process in accordance with claim 1 wherein polysiloxane (A) is dispersed in an organic, oxygen-containing diluent and the polysiloxane in said dispersion is reacted with cross-linking agent (B) in the presence of catalyst (C).

13. Process in accordance with claim 12 wherein a member of the group consisting of lower aliphatic alcohols, ethers, esters and ketones is employed as the oxygen-containing diluent.

14. Process in accordance with claim 12 wherein the dispersion medium comprises from 10% to 40% of said organic, oxygen-containing diluent.

15. Process in accordance with claim 1 wherein the reaction medium also contains a vinyl polymer.

16. Process in accordance with claim 15 wherein said vinyl polymer is polyvinyl chloride.

17. Process in accordance with claim 1 wherein the freshly mixed ingredients are used to make a mould of a body especially a part of the human body, and particularly for dental purposes.

18. Process in accordance with claim 1 wherein said mixture is shaped by insertion into the root canal of a tooth and said mixture cured while in said root canal.

19. Process in accordance with claim 18 wherein said shaped mixture contains at least one member of the group consisting of a sedative, a disinfectant and a devitalizing agent.

20. Process in accordance with claim 1 wherein the mixture of said components is applied immediately after mixing to a metal surface and cured thereon to form a coating strongly adherent to said metal surface.

21. Process in accordance with claim 1 wherein the mixture of said components is applied immediately after mixing to a metal surface and cured thereon to form a coating strongly adherent to said metal surface, said metal surface having a silicone resin applied thereto prior to the application of said mixture.

22. Process in accordance with claim 21 wherein said silicone resin coating reacts with at least one member of the group consisting of catalyst (C) and cross-linking agent (B).

23. Process for the production of a room temperature curing organo-polysiloxane elastomer, which consists in forming a mixture containing a nonreactive filler and having as its sole reactive components a linear, difunctional dimethyl-polysiloxane, a polysiloxane containing a major proportion of ethoxy groups and a catalyst comprising dibutyl tin dilaurate, said linear difunctional dimethylpolysiloxane being the major component, shaping the mixture and allowing the mixture to cure.

24. Process in accordance with claim 1 wherein components (A), (B) and (C) are applied in the form of a plurality of layers upon a support, each of said layers as applied containing not more than two of said components.

25. A room temperature curing organo-polysiloxane elastomer consisting of a non-reactive filler and whose sole reactive components are the compounds (A), (B) and (C), wherein (A) comprises the major component and is a linear, difunctional polysiloxane of the formula

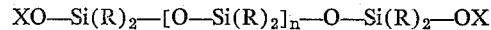

wherein R is a member of the group consisting of lower alkyl, aryl and halomethyl aryl groups, and X is a member of the group consisting of hydrogen and R, and $n$ is at least 50, (B) is a cross-linking agent which is a polyfunctional compound of the group consisting of (a) silanes of the formula $R_mSiX_{4-m}$ wherein R is a monovalent hydrocarbon radical of the group consisting of alkyl and aryl radicals, X is a member of the group consisting of —OH, alkoxy, aryloxy and amino radicals and $m$ has a value of from zero to below 2, (b) a polysiloxane obtained by polymerizing silane (a), (c) an organo-polysiloxane resin having a functionality greater than 2 of the group consisting of methyl-siloxanes, ethyl-siloxanes, dimethyl-siloxanes, monophenyl siloxanes and polysiloxanes containing a mixture of said groups, (d) organo-hydrogen polysiloxanes of the unit formula

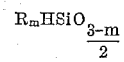

wherein $m$ is less than 2 but greater than zero, (e) reactive silicic acids, alkoxylated silicic acids and silicic acids having surface oriented —SiH groups, and (f) titanium esters and titanium ester polymers, and (C) is a condensation catalyst.

26. The cured composition obtained from a mixture of ingredients comprising (1) a linear, fluid organopolysiloxane containing terminal silicon-bonded hydroxy groups convertible to the cured, solid, elastic state and having a viscosity of from about 1,000 to about 50,000 centipoises when measured at 25° C., the organic groups of the aforesaid organopolysiloxane being selected from the class consisting of monovalent hydrocarbon radicals and halogenated aryl radicals attached to silicon by carbon-silicon linkages, (2) an alkyl silicate selected from the class consisting of (a) monomeric organosilicates corresponding to the general formula

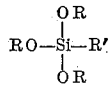

where R and R' are monovalent aliphatic groups, and R' in addition represents a member selected from the group consisting of monovalent aromatic, monovalent aliphatic-oxy and monovalent aromatic-oxy groups and (b) liquid partial hydrolysis products of the aforementioned organosilicate monomeric compounds, and (3) a metallic salt of an organic monocarboxylic acid capable of curing the convertible organopolysiloxane.

27. The cured composition obtained from a mixture of ingredients comprising (1) a linear, fluid organopolysiloxane containing terminal silicon-bonded hydroxy groups convertible to the cured, solid, elastic state and having a viscosity of from about 1,000 to about 50,000 centipoises when measured at 25° C., the organic groups of the aforesaid organopolysiloxane being selected from the class consisting of monovalent hydrocarbon radicals and halogenated aryl radicals attached to silicon by carbon-silicon linkages, (2) an alkyl silicate selected from the class consisting of (a) monomeric organosilicates corresponding to the general formula

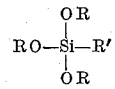

where R and R' are monovalent aliphatic groups, and R' in addition represents a member selected from the group consisting of monovalent aromatic, monovalent aliphatic-oxy and monovalent aromatic-oxy groups and (b) liquid partial hydrolysis products of the aforementioned organosilicate monomeric compounds, (3) a metallic salt of an organic monocarboxylic acid capable of curing the convertible organopolysiloxane, and (4) a filler.

28. The cured composition obtained from a mixture of ingredients comprising (1) a linear, fluid methylpolysiloxane containing terminal silicon-bonded hydroxy groups and having a viscosity of from about 1,000 to about 50,000 centipoises when measured at 25° C., (2) polyethyl silicate, (3) a tin salt of an organic monocarboxylic acid, and (4) a finely divided silica filler, the polyethyl silicate being present, by weight, in an amount equal to from 0.5 to 10 percent of the weight of (1) and the tin salt being present, by weight, in an amount equal to from 0.1 to 5 percent of the weight of (1).

29. The process for obtaining a composition of matter which can be converted at relatively low temperatures to the cured, solid, elastic state, which process comprises forming a mixture of ingredients comprising (1) a linear, fluid organopolysiloxane containing terminal silicon-bonded hydroxy groups convertible to the cured, solid, elastic state and having a viscosity of from about 1,000 to about 50,000 centipoises when measured at 25° C., the organic groups of the aforesaid organopolysiloxane being selected from the class consisting of monovalent hydrocarbon radicals and halogenated aryl radicals attached to silicon by carbon-silicon linkages, (2) an alkyl silicate selected from the class consisting of (a) monomeric organosilicates corresponding to the general formula

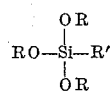

where R and R' are monovalent aliphatic groups, and R' in addition represents a member selected from the group consisting of monovalent aromatic, monovalent aliphatic-oxy and monovalent aromatic-oxy groups and (b) liquid partial hydrolysis products of the aforementioned organosilicate monomeric compounds, and (3) a metallic salt of an organic monocarboxylic acid capable of curing the convertible organopolysiloxane, and allowing the cure to take place at room temperature.

30. The process as in claim 29 in which the linear fluid organopolysiloxane is a methylpolysiloxane and the alkyl silicate is polyethylsilicate.

31. The process as in claim 30 in which the metallic salt is a tin salt.

32. The process as in claim 30 in which the metallic salt is a lead salt.

33. The process for making a composition of matter which can be converted at relatively low temperatures to the cured, solid elastic state, which process comprises forming a mixture of ingredients comprising (1) a linear, fluid methylpolysiloxane containing terminal silicon-bonded hydroxy groups and having a viscosity of from about 1,000 to about 50,000 centipoises when measured at 25° C., (2) polyethyl silicate, (3) a tin salt of an organic mono-carboxylic acid, and (4) a finely divided silica filler, the polyethyl silicate being present, by weight, in an amount equal to from 0.5 to 10 percent of the weight of (1) and the tin salt being present, by weight, in an amount equal to from 0.1 to 5 percent of the weight of (1), and allowing the cure to take place at room temperature.

References Cited in the file of this patent

UNITED STATES PATENTS

| | | |
|---|---|---|
| 2,123,152 | Rivat | July 5, 1938 |
| 2,494,920 | Warrick | Jan. 17, 1950 |
| 2,571,039 | Hyde | Oct. 9, 1951 |
| 2,584,351 | Hunter et al. | Feb. 5, 1952 |
| 2,615,861 | Peyrot | Oct. 28, 1952 |
| 2,692,844 | Hyde | Oct. 26, 1954 |
| 2,729,569 | Lipkind et al. | Jan. 3, 1956 |
| 2,754,237 | Brooks | July 10, 1956 |
| 2,814,601 | Currie et al. | Nov. 26, 1957 |
| 2,843,555 | Berridge | July 15, 1958 |